March 31, 1970 R. E. EASTMAN ET AL 3,504,194

SAMPLE AND HOLD CIRCUIT

Filed Sept. 29, 1967 2 Sheets-Sheet 1

INVENTORS
ROBERT E. EASTMAN
YAW KUEN CHEN

BY Joseph Weingarten

ATTORNEYS

INVENTORS
ROBERT E. EASTMAN
YAW KUEN CHEN
BY Joseph Weingarten
ATTORNEYS

United States Patent Office 3,504,194

Patented Mar. 31, 1970

3,504,194

SAMPLE AND HOLD CIRCUIT

Robert E. Eastman, Raynham, and Yaw Kuen Chen, Norwood, Mass., assignors to Epsco Incorporated, Westwood, Mass., a corporation of Massachusetts Filed Sept. 29, 1967, Ser. No. 671,636
Int. Cl. H03k *19/00*
U.S. Cl. 307—238 2 Claims

ABSTRACT OF THE DISCLOSURE

A sample and hold circuit is described which samples an amplitude modulated periodic waveform and provides an output of that same waveform at an amplitude corresponding to the amplitude of the input signal at the time of sampling. Two reference signals, displaced in phase by 180° and of the same frequency as the input signal are coupled to the summing junction of an operational amplifier. An insulated gate field effect transistor couples one of the reference signals to the summing junction. The insulated gate transistor is controlled by the charge in a storage capacitor across which the input signal is intermittently impressed by a sampling switch.

FIELD OF THE INVENTION

This invention relates in general to a sample and hold device and more particularly pertains to an electronic device which samples an amplitude modulated periodic signal and provides an output which duplicates the amplitude and waveform of the periodic signal until the next sample is taken.

BRIEF DISCUSSION OF THE PRIOR ART

A sample and hold circuit is, in essence, a short term memory device. In some electrical apparatus, there is a requirement that a varying direct current (D.C.) voltage be sampled at intervals to obtain instantaneous values of the voltage and that the instantaneous value obtained from a sample be maintained until the next sample is taken. Such a requirement occurs, for example, where equipment governed by an input signal cannot respond quickly to rapid fluctuations of the input signal or where equipment requires a period of time longer than expected variations in the input signal to complete a sequence of operations. That requirement also occurs in multiplexing systems where a saving is realized by time sharing the equipment. Another typical instance exists where the instantaneous value of the voltage of a signal is to be compared to some reference which must be located by an address system with the possible elapsed time of addressing and comparison exceeding the period of time in which the voltage of the signal might remain stable. There are a variety of existing circuits to perform this sample and hold function for D.C. input signals and the hold mechanism in the conventional circuit operates by charging a capacitor through a switching arrangement and connecting a readout amplifier across the capacitor to provide an output proportional to the voltage on this capacitor. To maintain a constant input to the readout amplifier for some period of time, the input impedance of the amplifier must be sufficiently high so that it does not drain the charge from the capacitor too rapidly. Yet the values of the capacitor must be sufficiently low so that it may be rapidly charged through the input impedance of the switching arrangement when it is in its closed switch position. One recent circuit element which has proved useful as an amplifier in sample and hold circuits is the field effect transistor, which is characterized be a very high input impedance.

Conventional sample and hold circuits provide a direct current output voltage and are, therefore, limited to applications which do not require the circuit to provide a periodically varying output voltage, such as a sinusoidally varying alternating current. There are, however, situations where it is desired to perform a sample and hold function on a periodically varying, amplitude modulated waveform. In those situations the circuit must be capable of providing at its output, for the holding period, the periodic waveform at the amplitude value corresponding to the amplitude at the moment of sampling. Such a situation exists, for example, in an arrangement for multiplexing synchro signals, where the signals are amplitude modulated sine waves at a predetermined carrier frequency.

SUMMARY OF THE INVENTION

It is therefore the primary object of the present invention to provide a sample and hold circuit for sampling a periodically varying, amplitude modulated signal and providing an output signal having the same periodic waveform and at an amplitude corresponding to the amplitude of the input signal at the moment of sampling.

Broadly speaking, the sample and hold circuit of this invention, samples an amplitude modulated periodic waveform, such as an amplitude modulated sine wave, for a fraction of a period and provides as an output, until the next sample is taken, that same waveform at an amplitude value corresponding to the amplitude at the time of sampling. Assuming, for example, that the sampled signal is an amplitude modulated 400 Hz. signal such as occurs in a synchro system, when the ampltude of the sample is one polarity with respect to the A.C. zero axis, the output waveform is in phase with the 400 Hz. synchro carrier; when the sampled signal is of the opposite polarity, the output waveform is 180° out of phase with the synchro carrier.

The circuit of this invention employs an operational amplifier which has its output terminal coupled back through a fixed resistor to the amplifier's summing junction. Two reference signals having the same frequency as the input signal to be sampled are coupled to the summing junction of the amplifier. The two reference signals not only are of the same frequency, but are phase coherent with respect to each other so that from cycle to cycle, the same phase relation exists between the two signals. An insulated gate field effect transistor (variously known in the electronics industry as an IGFET or IGT) couples one of the reference signals to the summing junction and the other reference signal is coupled to that junction through a fixed resistor. The gate of the transistor is controlled by the charge in a storage capacitor. A sampling switch enables the capacitor to be periodically charged to the instantaneous peak amplitude value of the amplitude modulated periodic waveform. The insulated gate field effect transistor serves as a variable resistor whose resistance is controlled by the peak amplitude of the sample and, that resistor in turn controls the amplitude of the reference signal fed through it to the summing junction of the operational amplifier. The output from the operational amplifier is a periodic waveform having an amplitude proportional to the value of the amplitude modulated waveform at the moment of sampling and a phase controlled by the polarity of the modulated signal at the time of sampling.

BRIEF DESCRIPTION OF THE DRAWING

Other objects and advantages will become apparent from the following detailed description when taken in conjunction with the accompanying drawing in which.

Figure 1:
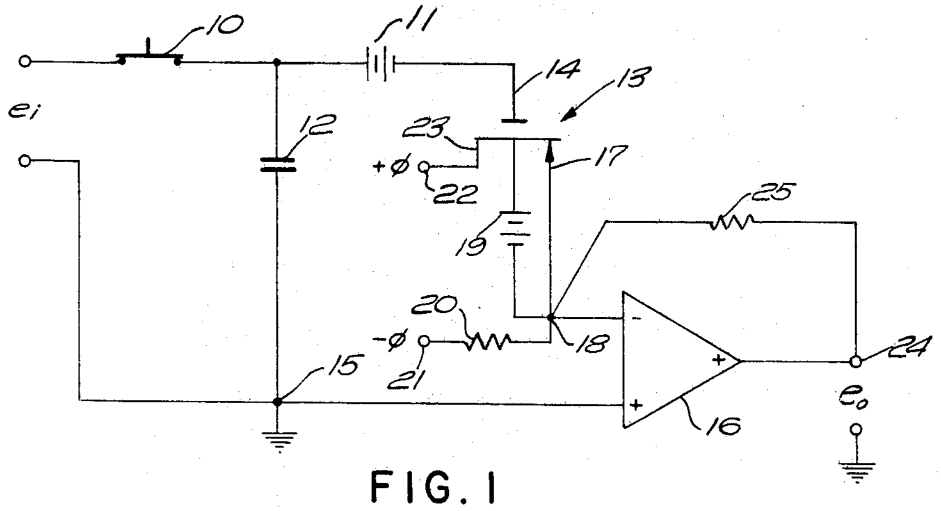
FIG. 1 is a diagram showing the scheme of a sample and hold circuit constructed in accordance with the principles of this invention.

For the purpose of exposition the signal to be sampled by the sample and hold circuit depicted in FIG. 1 is assumed to be an amplitude modulated, periodic, sinusoidal, waveform. It should be understood, however, that the signal to be sampled may take other forms, such as triangular wave or square wave.

DESCRIPTION OF THE PREFERRED EMBODIMENT

Figure 2:
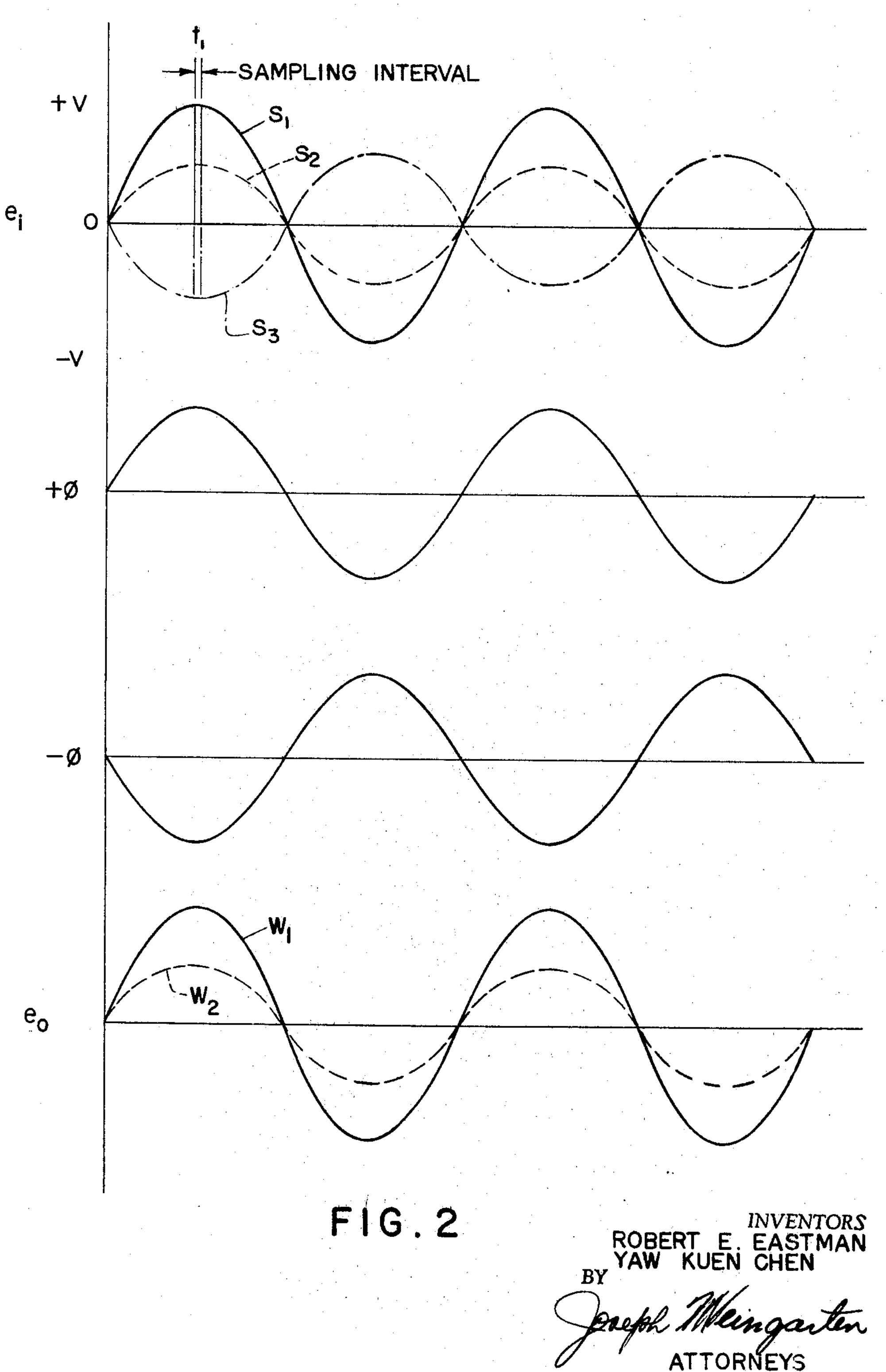
FIG. 2 is a graphical illustration of waveforms helpful to an understanding of this invention.

Referring now to FIG. 1, the input signal $e_i$ is sampled by closing a switch 10 for a brief time. During the sampling interval the input signal is impressed across storage capacitor 12. The input signal $e_i$ is here assumed to be a recurring sine wave of fixed wavelength whose amplitude is varied to convey information. Such signals are commonly employed in synchro systems to convey positional data. In FIG. 2, the signal $e_i$ for example, initially may have the amplitude represented by the $S_1$ waveform and the amplitude of the $e_i$ signal may later be reduced to the amplitude represented by the $S_2$ waveform or may even assume the "negative" amplitude represented by the $S_3$ waveform. Thus, the maximum amplitude of a half cycle of the $e_i$ signal may assume any value between $+V$ and $-V$. It is assumed that the changes in amplitude of $e_i$ occur gradually and that switch 10 is closed periodically at a rate which permits the charge in the storage capacitor to follow the changes in the peak amplitude of $e_i$ reasonably smoothly. An insulated gate field effect transistor 13 has its gate electrode 14 connected through the battery 11 and capacitor 12 to the grounded input terminal 15 of operational amplifier 16. The source 17 of the insulated gate transistor is connected to the summing junction 18 of the operational amplifier and a battery 19 is employed to maintain the substrate at a positive potential with respect to the summing junction.

The terms "drain" and "source" used here in connection with the insulated gate field effect transistor 13 are purely arbitrary where that transistor is a symmetrical device in which current can flow in either direction between those two terminals in dependence upon the polarity of the potentials impressed at those terminals. That is, because a symmetrical insulated gate transistor can conduct current in either direction equally well, the use of the terms "drain" and "source" to designate leads on the insulated gate transistor has meaning only if the direction of current flow is in one direction when the device is in use.

The summing junction 18 of operational amplifier 16 is connected through a resistor 20 to a terminal 21 at which is impressed a signal designated $-\phi$. A signal designated $+\phi$ is simultaneously impressed, through terminal 22, upon the drain 23 of the insulated gate transistor. The $+\phi$ and $-\phi$ signals, as indicated in FIG. 2, have the same frequency and waveform as the input signal $e_i$. The $-\phi$ signal, however, is 180° out of phase with the $+\phi$ signal and those A.C. signals, unlike the $e_i$ signal, are not modulated but, rather, are unvarying A.C. signals. The output terminal 24 of the operational amplifier is connected to the summing junction 18 by a resistor 25. The term operational amplifier, as here employed, designates an inverting amplifier which ideally has infinite gain, infinite input impedance and zero output impedance. A characteristic of the operational amplifier is the "virtual ground" which exists at its summing junction input. With an ideal operational amplifier, in the circuit of FIG. 1, the potential at the summing junction 18 would not change. The ideal operational amplifier is, of course, unrealizable in practice but devices approximating the ideal are available.

Having described the scheme of the sample and hold circuit, its operations will now be discussed. The sampling switch 10, which may be any suitable switch having high impedance when opened and a reasonably low impedance when closed, is closed to sample the input signal at its peak. As previously mentioned, the input signal is an amplitude modulated sine wave at a predetermined frequency. The sampling time $t_1, t_2 \ldots t_n$ is arranged to occur during the same portion of a half cycle on each sampling. The sampling switch is closed for a sufficiently long fraction of a half cycle to permit the capacitor 12 to charge to a voltage proportional to the peak amplitude of the modulated waveform at the sampling time. Because gate 14 is well insulated from the rest of the transistor, no appreciable gate current is drawn by the transistor. Therefore, the input signal $e_i$ has only to charge the storage capacitor 12 and the charge remains unaltered in that capacitor while the switch 10 is open.

Initially with the input terminals short circuited, with the switch 10 closed, and with the $-\phi$ and $+\phi$ signals applied to terminals 21 and 22, the bias on gate 14, applied by battery 11, maintains the A.C. output of the operational amplifier at zero. In effect, the source to drain impedance of the insulated gate transistor is adjusted to a value that nulls the A.C. output of the operational amplifier. After this initial state has been obtained, the switch 10 is opened and closed periodically to sample the input signal $e_i$ at its peak.

The electrical charge in storage capacitor 12 may be either positive or negative depending upon the polarity of the input signal $e_i$ at the time of sampling. The charge in storage capacitor 12 governs the conductivity between the source and drain of the transistor. The operational amplifier, through feedback resistor 25, provides at junction 18 a current that maintains the junction at "virtual ground." To furnish that feedback, the output $e_o$ is determined by the charge in storage capacitor 12 and the phase of signal $e_o$ relative to the $+\phi$ and $-\phi$ signals is determined by the electrical polarity of the charge in the storage capacitor.

So long as the charge in the storage capacitor remains at a steady value, the output of the operational amplifier is a sine wave of fixed frequency and constant amplitude. Assuming that there is a charge in the storage capacitor, the output $e_o$ of the operational amplifier, in the interval between samples, is an unvarying sine wave. When the next sample is taken and a change occurs in the charge stored in capacitor 12, a corresponding change occurs in the output signal $e_o$. For example, assuming the input signal $e_i$ has the $S_1$ waveform when it is sampled at time $t_1$ and that the output signal $e_o$ is represented in FIG. 2 by the $W_1$ sine wave, the operational amplifier continues to emit the $W_1$ sine wave regardless of the changes that may have occurred in the $e_i$ signal after it was sampled. At the next sampling, the $e_i$ signal may have the amplitude represented by the $S_2$ waveform, causing the charge in the storage capacitor to be decreased. Consequently, the operational amplifier decreases the amplitude of its output signal $e_o$ as represented by sine wave $W_2$ and continues to emit the $W_2$ signal until another change occurs in the charge stored in capacitor 12.

The operation of the sample and hold circuit is made possible by the characteristics of the insulated gate field effect transistor. Thus, the extremely high gate to substrate resistance (typically $10^{13}$ ohms) enables a storage capacitor of small capacitance to be used and enables the capacitor to retain its charge for exceedingly long periods of time.

A circuit utilizing the component values tabulated below has performed satisfactorily for a sine wave carrier at a frequency of 400 Hz.

Figure 3:
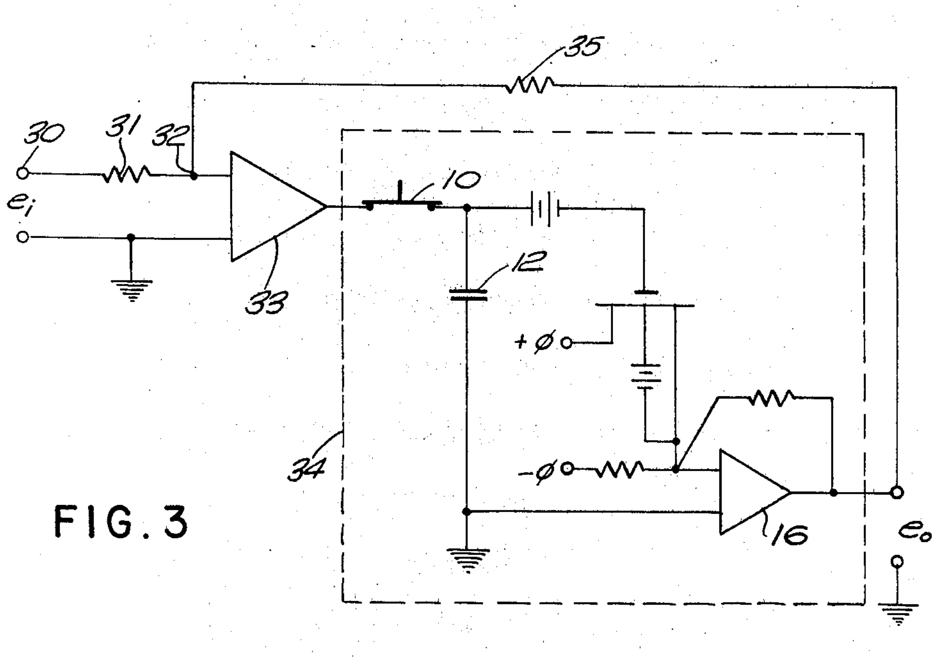
FIG. 3 schematically depicts an improved embodiment of the invention.

Transistor 13—MEM 511
Capacitor 12—2 $\mu$f.
Resistor 20—20,000 ohms
Resistor 25—470,000 ohms FIG. 3 shows an improved embodiment of the invention. The input signal $e_i$ is applied at terminal 30 and is impressed through resistor 31 upon the summing junction 32 of a non-inverting amplifier 33. The output of the non-inverting amplifier, which is here termed "the error signal," is the input to the sample and hold circuit 34. The output of the sample and hold circuit is fed through resistor 35 to the summing junction 32. The error signal output of amplifier 33 is intermittently sampled by closing switch 10 and the sample and hold circuit operates in the manner previously described. During the sampling interval, the charge in storage capacitor 12 is altered in the direction tending to reduce the error signal to zero.

Because the invention can be modified in obvious ways without changing its essential nature, it is not intended that the scope of the invention be restricted to the precise embodiment illustrated in the drawings. For example, it is obvious to those skilled in the electronics art that the source, drain, and substrate connections of the insulated gate transistor depicted in FIG. 1 of the drawings can be altered and that those connections will be governed by the characteristics of the transistor. Further, it is obvious that the amplifier 33 in FIG. 3 can be of the inverting type and that other arrangements can be made to invert the signal fed back to the summing junction 32. It is intended, therefore, that the scope of the invention not be limited by the appended claims and include such structures as do not in essence fairly depart from the invention there defined.

We claim:

1. A circuit for intermittently sampling an input signal having an amplitude modulated waveform, the circuit comprising:

a storage capacitor;

a switch for momentarily applying the amplitude modulated input signal across the storage capacitor;

an insulated gate transistor having its gate connected to the storage capacitor;

an operational amplifier having an input summing junction and having an output fed back through a resistor to the input summing junction;

the insulated gate transistor coupling to the summing junction an unmodulated first signal of the same waveform as the input signal; and a second resistor coupling to the summing junction an unmodulated second signal having the same waveform as the first signal but being 180° out of phase with the first signal.

2. A circuit for intermittently sampling an input signal having an amplitude modulated waveform, the circuitry comprising:

a first amplifier having an input summing junction;

means for impressing the input signal upon the summing junction of the first amplifier, the first amplifier providing an error signal at its output;

a storage capacitor;

a switch for momentarily applying the error signal across the storage capacitor;

an insulator gate transistor having its gate connected to the storage capacitor;

an operational amplifier having its output fed back through a resistor to its own input summing junction, the output of the operational amplifier also being fed through a resistor to the input summing junction of the first amplifier;

the insulated gate transistor coupling to the summing junction of the operational amplifier an unmodulated first signal of the same waveform as the input signal; and a resistor coupling to the summing junction of the operational amplifier an unmodulated second signal of the same waveform as the first signal but 180° out of phase with the first signal.

References Cited

UNITED STATES PATENTS

| | | | |
|---|---|---|---|
| 3,373,295 | 3/1968 | Lambert | 307—238 |
| 3,413,491 | 11/1968 | Reeves et al. | 307—235 |

DONALD D. FORRER, Primary Examiner

J. ZAZWORSKY, Assistant Examiner

U.S. Cl. X.R.

307—264, 304; 328—151; 332—31